United States Patent [19]

Neustein

[11] 4,196,718
[45] Apr. 8, 1980

[54] ENERGY CONSERVATION

[76] Inventor: David N. Neustein, 124 Gilda Ave., Pittsburgh, Pa. 15217

[21] Appl. No.: 926,878

[22] Filed: Jul. 24, 1978

[51] Int. Cl.² .................................................. F24J 3/02
[52] U.S. Cl. .................................... 126/427; 126/416; 126/422
[58] Field of Search ............... 126/271, 427, 416, 422; 237/1 A, 8 R; 165/DIG. 2; 122/20 B

[56] References Cited

U.S. PATENT DOCUMENTS

| 2,257,524 | 9/1941 | De Bogory | 126/271 |
| 2,521,462 | 9/1950 | Kinzelmann | 122/20 B |
| 3,299,881 | 1/1967 | Koch | 126/271 |
| 3,896,992 | 7/1975 | Borovina et al. | 237/8 R |
| 4,143,814 | 3/1979 | Hill, Jr. | 126/271 |
| 4,143,816 | 3/1979 | Skadeland | 165/DIG. 2 |

*Primary Examiner*—Henry C. Yuen
*Attorney, Agent, or Firm*—Hymen Diamond

[57] ABSTRACT

A solar heating system for a building in which the liquid in the solar cell is subjected both to radiation from the sun and to the heat from the exhaust chimney gases from the building furnace.

1 Claim, 4 Drawing Figures

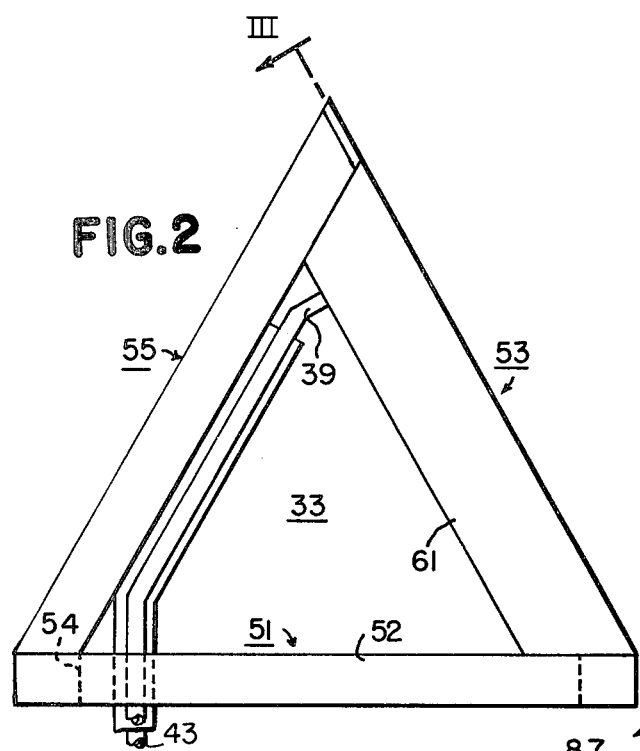
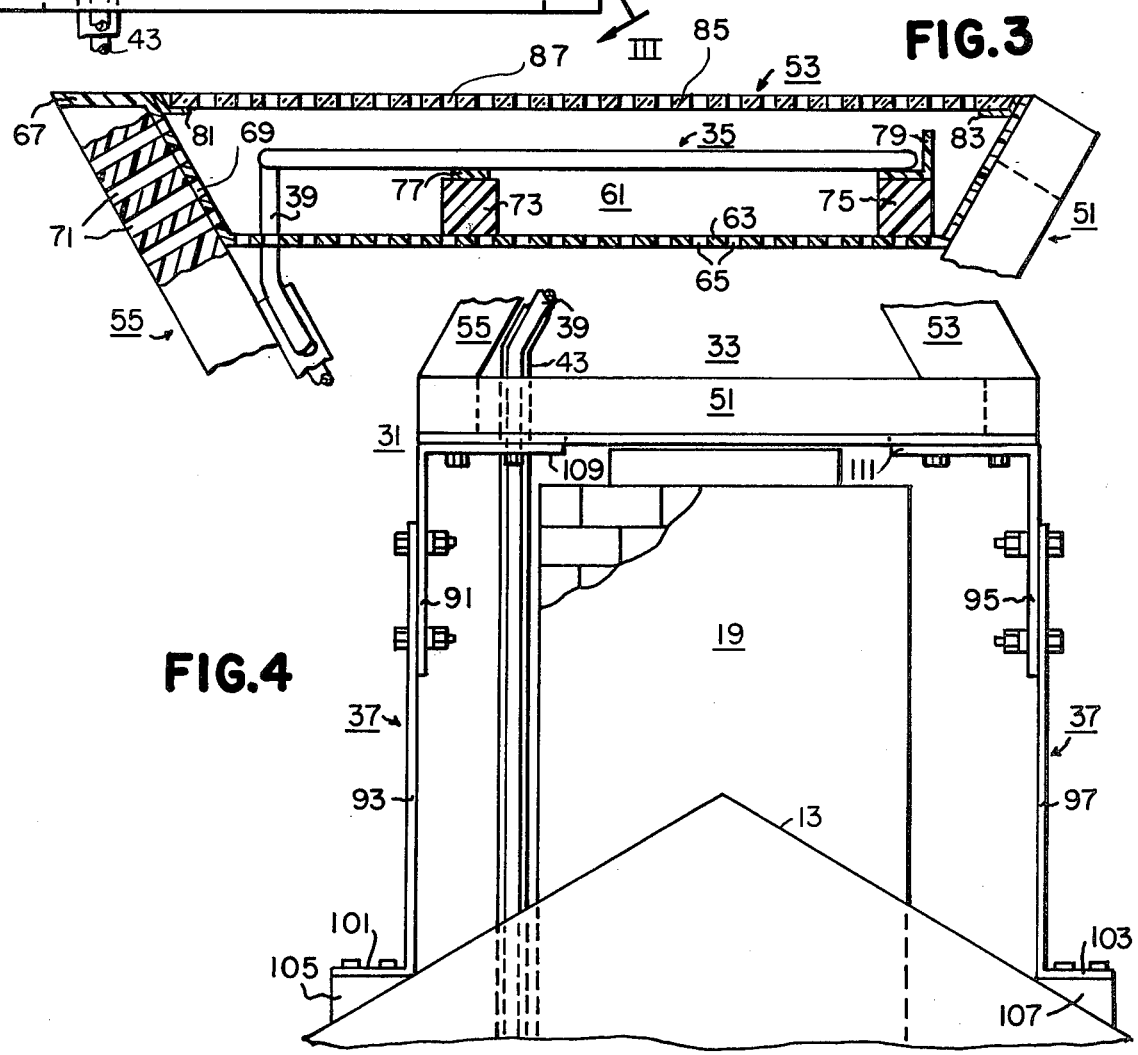

ENERGY CONSERVATION

BACKGROUND OF THE INVENTION

This invention relates to energy conservation and has particular relationship to the use of solar cells in energy conservation. In the typical use of solar cells a fluid, usually a liquid such as water, is circulated through an array of tubes. The tubes are composed of highly thermally conducting material, such as copper, and are coated with material which is highly radiation absorptive. The tubes are disposed, usually on the roof of a building, for example, a dwelling, so that they are subject to the radiation from the sun. The fluid in the tubes is heated by this radiation and it is circulated to a fluid reservoir whence the fluid is drawn when required.

It is an object of this invention to maximize the energy which is conserved by solar heating systems.

SUMMARY OF THE INVENTION

This invention arises from the realization that any building or like establishment exhausts hot waste fluids, particularly gases, a large part of whose energy can be conserved by use of solar cells. In accordance with this invention, the solar cell is subject not only to the radiation from the sun, but also to the waste fluids so that it is heated by both. Specifically the solar cell is mounted on the roof of a building so that the exhaust gas from the chimney flows in contact with its tubing while this tubing is impinged by the radiation from the sun. The temperature of the fluid in the tubing is raised by the exhaust gases and also by the radiation from the sun so that the fluid in the cell is at a substantially higher temperature than fluids subject only to the sun's radiation.

In the usual practice of this invention, water is the fluid which is heated by the radiation from the sun and by the exhaust gas since predominately the utility of the invention resides in heating water for household and other purposes. However, within the broader scope of this invention other liquids and even gases may be used as the fluid to be heated. In the interest of convenience and clarity the word, "water" or "liquid" is used in the claims. These words are to be taken to mean fluids of all phases.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 2 is a fragmental view in side elevation showing the frame structure in which the solar cell is mounted of the apparatus shown in FIG. 1;

FIG. 3 is a view in section taken along line III—III of FIG. 2; and

FIG. 4 is a view in end elevation of the bracket on which the frame structure shown in FIG. 2 is mounted in the practice of this invention.

DETAILED DESCRIPTION OF INVENTION

Figure 1:
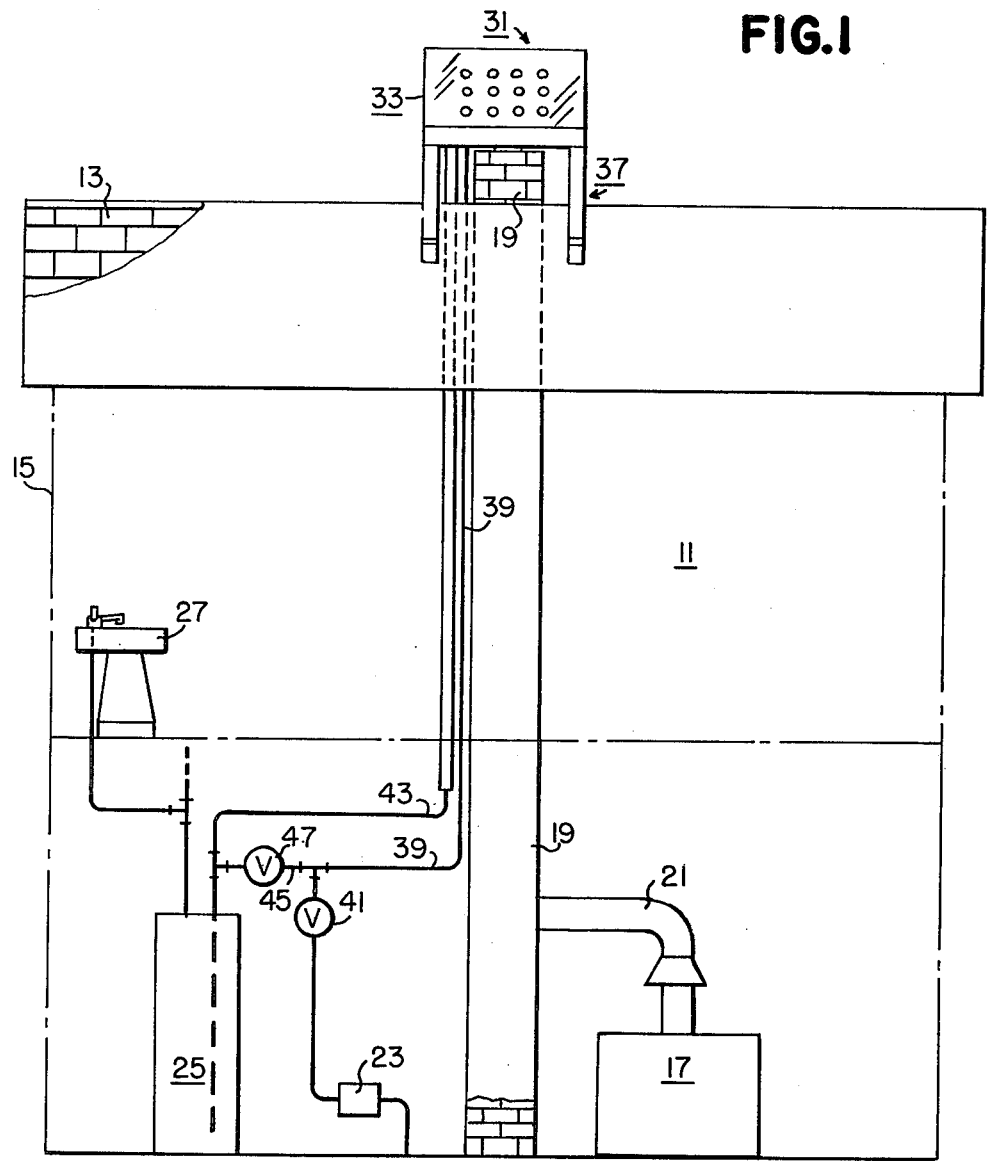
FIG. 1 is a diagrammatic view showing an embodiment of this invention.

As typical of the practice of this invention, the apparatus shown in the drawings includes a building 11 such as a dwelling. The building 11 has a conventional gabled sloping roof 13 extending from conventional walls 15. Within the building 11 there is furnace 17 for heating the building. The exhaust gas from the furnace and also from other facilities such as fire places and stoves (not shown) flow to a chimney 19 terminating on the roof through conductors 21 such as that from the furnace 17.

The building 11 is supplied with water in conventional manner through a service meter 23. The building 11 also has a hot-water reservoir 25 for supplying its appliances, typically a sink 27 and baths, clothes washers, dish washers, etc. (not shown). The reservoir 25 is represented as a conventional hot-water tank. In the practice of this invention the reservoir 25 may be a separate receptacle typically located just under the roof 13 near the chimney 19.

The building 11 also includes a solar heating system 31. The solar heating system 31 includes a triangular or A-frame structure 33 (FIGS. 2 and 3) in one of whose sides a solar fuel cell 35 (FIG. 3) is mounted. The triangular frame structure is mounted on a bracket 37 (FIG. 4) spanning the chimney 19. A conductor 39 (FIG. 1) conducts water from the meter 23 to the inlet of the cell 35 through an appropriate valve 41. The heated water is conducted by an insulated conductor 43 to the reservoir 25. Where the reservoir 25 is a hot-water tank, water is also conducted from the meter 23 through conductor 45 to the reservoir 25. An appropriate valve 47 is interposed in the conductor 45 between the conductor 39 and the conductor 43.

The frame structure 33 (FIGS. 2 and 3) in transverse cross section and as viewed in side elevation is in the form of an equilateral triangle. The base of the triangle is an open rectangular frame 51 composed of a material adequate to support the frame structure such as steel or an appropriate composition such as a phenol condensation product. The frame 51 has sides 52 and 54. The member constituting one side of the triangle is a solar cell assembly 53. The member constituting the other side of the triangle is a solid plate 55 of plastic or polyurethane foam or styrofoam.

The solar cell assembly 53 includes a pan 61 whose bottom 63 has holes 65 to permit the penetration of the heated exhaust air from the chimney 21. On the side adjacent the plate 55 the pan 61 has an extension 67 of generally J cross section analogous to the handle of a household pan. The extension 67 serves to secure the pan 61 to the plate 55. The side of the pan 61 adjacent the extension is perforated some of the holes 69 being coextensive with holes 71 in the plate 55. Pairs of blocks 73 and 75 (one of each pair not shown) typically of wood or plastic are disposed spaced transversely along the bottom 63 of the pan 61. A strip 77 of plastic or the like is supported on one set 73 of the blocks and an angle 79 of like material is supported on the other set 75. The fuel cell 35 is supported across the strip 77 and the angle 79. Pairs of ears 81 and 83 (only one of each pair shown) extend spaced transversely from the rim of pan 61. A plate 85 of transparent material such as glass or fiberglass is supported on the pairs of ears 81 and 83. The plate 85 has a plurality of holes 87 around its periphery through which the exhaust gas from chimney 21 that flows from the pan 61 is exhausted. Typically the pan 61 is composed of aluminum and is coated with a radiation absorbing (black) paint which also is corrosion resistant.

The bracket 37 on which the frame structure 33 is supported is composed of opposite pairs of angles 91 and 93 and 95 and 97. The pairs 91 and 93 and 95 and 97 are secured together by bolts 99. The legs of the angles 91 and 93 or 95 and 97 have a plurality of holes, or are slotted, so that the height of the bracket 37 may be set as required. The feet 101 and 103 of the angles 93 and 97 extend outwardly of the bracket 37 and are secured to the roof 13 through tapered blocks 105 and 107 which are tapered to match the slope of the roof. The feet 109 and 111 of the angles 91 and 95 extend inwardly of bracket 37 and are secured to the base frame 51 of the frame structure 33. The frame structure 33 is oriented so that the solar cell 35 is exposed to the sun's radiation. Above the Tropic of Cancer the solar cell 35 should face in a generally southerly direction; below the Tropic of Capricorn in a generally northerly direction. The orientation of the solar cell should be such that the impingement of the sun's radiation on it, as the earth turns from west to east, is maximized.

In the use of the apparatus the water circulated through the cell 35 is heated by the sun's radiation and also by the exhaust gases from furnace 17. The conservation of energy from the furnace is thus maximized.

While a preferred embodiment of this invention has been disclosed herein, many modifications thereof are feasible. This invention is not to be restricted except insofar as is necessitated by the spirit of the prior art.

This invention is uniquely suitable for use in a building, particularly a dwelling. It may, however, have other uses. For example, the disposal of the heated waste water from a nuclear reactor has presented serious problems. The discharge of this heated water into the ocean, which has been proposed, has been found objectionable because of the deleterious effect which it may have on marine life. Based on the teaching of this invention, this heated waste water could serve to heat a solar cell whose output could be used to supply auxiliary power to the reactor containment. To the extent that this invention is applicable to such uses, such uses fall within the scope of this application.

I claim:

1. Solar-heating apparatus for a building having a roof, heating means, water-supply means and a reservoir for heated water and including a chimney on said roof having an exit opening for exhausting the gases from said heating means, the said apparatus including a solar cell including tubular means composed of highly thermally conducting and radiation absorbing material, means for mounting said tubular means on said roof over the exit opening of said chimney in a position where it receives and is heated by the radiation from the sun and is also heated by the gases exhausted through said exit opening of said chimney, said mounting means including a generally triangular frame structure formed of an open-frame hose, a solar pan containing the solar cell forming one side of said frame structure and a plate forming the other side of said frame structure, said solar pan having a bottom which is perforated and being covered by a radiation-transparent plate which is also perforated so that the gas exhausted from said heating means may flow in and out of said pan, said triangular frame structure to be mounted over the chimney with said base engaging the roof around the joint between the chimney and the roof, the solar pan extending on one side of the chimney and the plate extending on the opposite side of the chimney, said pan being oriented so that the solar cell receives the radiation from the sun continuously as the earth rotates from west to east, first means, to be connected to said tubular means, for supplying water to said tubular means from said water supply means and second means, to be connected to said tubular means, for supplying to said reservoir the water from said tubular means which has been heated by the radiation from the sun and by said exhaust gases.

* * * * *